(12) United States Patent
Xia et al.

(10) Patent No.: US 11,516,110 B2
(45) Date of Patent: Nov. 29, 2022

(54) METHOD AND APPARATUS FOR OBTAINING CROSS-DOMAIN LINK

(71) Applicant: HUAWEI TECHNOLOGIES CO., LTD., Shenzhen (CN)

(72) Inventors: Chongpu Xia, Nanjing (CN); Shijing Huang, Nanjing (CN); Zhongchao Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 51 days.

(21) Appl. No.: 16/910,204

(22) Filed: Jun. 24, 2020

(65) Prior Publication Data
US 2020/0336405 A1 Oct. 22, 2020

Related U.S. Application Data

(63) Continuation of application No. PCT/CN2018/122207, filed on Dec. 20, 2018.

(30) Foreign Application Priority Data

Dec. 29, 2017 (CN) .......................... 201711479278.1

(51) Int. Cl.
*H04L 12/751* (2013.01)
*H04L 45/02* (2022.01)
(Continued)

(52) U.S. Cl.
CPC .............. *H04L 45/02* (2013.01); *H04L 41/12* (2013.01); *H04L 45/04* (2013.01);
(Continued)

(58) Field of Classification Search
CPC ......... H04L 45/02; H04L 41/12; H04L 45/04; H04L 61/6022; H04Q 11/0062; H04Q 2011/0073
(Continued)

(56) References Cited

U.S. PATENT DOCUMENTS 7,099,580 B1 * 8/2006 Bulbul .................... H04L 41/12
398/58
8,953,433 B1 2/2015 Grammel
(Continued)

FOREIGN PATENT DOCUMENTS

CN 1509548 A 6/2004
CN 1558618 A 12/2004
(Continued)

*Primary Examiner* — Obaidul Huq
(74) *Attorney, Agent, or Firm* — Maier & Maier, PLLC

(57) ABSTRACT

A method for obtaining a cross-domain link. The method includes: a control device sends a first message to a forwarding device in an internet protocol (IP) domain, where the first message is used to instruct the forwarding device to search for a device adjacent to the forwarding device in an optical domain; the control device receives a second message from an optical network element adjacent to the forwarding device in the optical domain, where the second message includes a first identifier identifying the optical network element, a second identifier identifying a port communicating with the forwarding device and being on the optical network element, and a media access control (MAC) address of the forwarding device; and obtains the cross-domain link between the forwarding device and the optical network element based on the first identifier, the second identifier, and the MAC address of the forwarding device.

12 Claims, 7 Drawing Sheets

(51) Int. Cl.
*H04L 41/12* (2022.01)
*H04Q 11/00* (2006.01)
*H04L 101/622* (2022.01)

(52) U.S. Cl.
CPC .... *H04Q 11/0062* (2013.01); *H04L 2101/622* (2022.05); *H04Q 2011/0073* (2013.01)

(58) Field of Classification Search
USPC ......................................... 370/310, 328, 329
See application file for complete search history.

(56) References Cited

U.S. PATENT DOCUMENTS

| | | |
|---|---|---|
| 2005/0036484 A1 | 2/2005 | Barker |
| 2006/0098642 A1 | 5/2006 | Mallya et al. |
| 2007/0280265 A1* | 12/2007 | Gerstel ............... H04L 41/0806 370/395.52 |
| 2013/0268686 A1* | 10/2013 | Wang ................ H04L 65/1069 709/228 |
| 2014/0373097 A1 | 12/2014 | Thayer et al. |
| 2017/0005980 A1 | 1/2017 | Zheng |
| 2018/0006894 A1* | 1/2018 | Power ..................... H04L 41/12 |

FOREIGN PATENT DOCUMENTS

| | | |
|---|---|---|
| CN | 101483638 A | 7/2009 |
| CN | 101516045 A | 8/2009 |
| CN | 101820556 A | 9/2010 |
| CN | 103782553 A | 5/2014 |
| CN | 103841186 A | 6/2014 |
| CN | 104253765 A | 12/2014 |
| CN | 105960780 A | 9/2016 |
| CN | 106534369 A | 3/2017 |
| CN | 107302849 A | 10/2017 |
| CN | 107370673 A | 11/2017 |
| EP | 1349322 A1 | 10/2003 |
| EP | 1 592 181 A1 | 11/2005 |
| WO | 02/073879 A2 | 9/2002 |
| WO | 2015032026 A1 | 3/2015 |
| WO | 2015042824 A1 | 4/2015 |
| WO | 2016081734 A2 | 5/2016 |
| WO | 2017/004747 A1 | 1/2017 |

* cited by examiner

METHOD AND APPARATUS FOR OBTAINING CROSS-DOMAIN LINK

CROSS-REFERENCE TO RELATED APPLICATIONS

This application is a continuation of International Application No. PCT/CN2018/122207, filed on Dec. 20, 2018, which claims priority to Chinese Patent Application No. 201711479278.1, filed on Dec. 29, 2017. The disclosures of the aforementioned applications are hereby incorporated by reference in their entireties.

TECHNICAL FIELD

The embodiments relate to the communications field, and in particular, to a method and an apparatus for obtaining a cross-domain link.

BACKGROUND

An internet protocol (IP) backbone network usually includes an IP domain including a router and an optical domain including a wavelength division multiplexing device (also referred to as an optical network element). During service deployment on the IP backbone network, a deployed service needs to be processed by the router in the IP domain and the wavelength division multiplexing device in the optical domain. In the IP backbone network, a controller in the IP domain can obtain only a first link. The first link is in the IP domain and is related to the deployed service. A controller in the optical domain can obtain only a second link. The second link is in the optical domain and is related to the deployed service. To implement the service deployed in the IP backbone network, the first link and the second link need to be associated by using a cross-domain link between the IP domain and the optical domain. However, generally, the IP domain and the optical domain are separately planned, operated, and maintained by domain. For example, a link between the IP domain and the optical domain is planned in advance, and information about the planned link is configured on the router in the IP domain and the corresponding optical network element in the optical domain. As a result, the IP domain and the optical domain have low resource utilization and high operation and management (O&M) costs in terms of planning, deployment, and O&M. In addition, in a foregoing method for planning the service deployment in advance, there may be a problem of low configuration efficiency in a large-scale service deployment process.

SUMMARY

Embodiments provide a method and an apparatus for obtaining a cross-domain link to help improve service configuration efficiency based on the obtained cross-domain link.

According to a first aspect, a method for obtaining a cross-domain link is provided. The method includes: sending, by a control device, a first message to a forwarding device in an IP domain, where the first message is used to instruct the forwarding device to search for a device that is adjacent to the forwarding device and that is in an optical domain; receiving, by the control device, a second message from an optical network element in the optical domain, where the second message includes a first identifier, a second identifier, and a media access control (MAC) address of the forwarding device, the first identifier is used to identify the optical network element, the second identifier is used to identify a port that communicates with the forwarding device and that is on the optical network element, and the optical network element is the device that is adjacent to the forwarding device and that is in the optical domain; and obtaining, by the control device, the cross-domain link between the forwarding device and the optical network element based on the first identifier, the second identifier, and the MAC address of the forwarding device.

In the foregoing method, a first control device may trigger the forwarding device in the IP domain to search the optical domain for the device that is adjacent to the forwarding device in the IP domain, to determine that there is a connection relationship between the optical network element in the optical domain and the forwarding device in the IP domain. By using the foregoing method, the first control device can obtain the cross-domain link between the optical network element in the optical domain and the forwarding device in the IP domain. In this way, in a process of configuring a cross-domain service, the cross-domain link does not need to be manually planned and configured in advance. This helps improve efficiency of configuring the cross-domain service.

In an implementation, the obtaining, by the control device, of the cross-domain link between the forwarding device and the optical network element based on the first identifier, the second identifier, and the MAC address of the forwarding device includes: obtaining, by the control device, a correspondence based on the first identifier, the second identifier, and the MAC address of the forwarding device, where the correspondence is used to indicate the cross-domain link between the forwarding device and the optical network element, and the correspondence includes the first identifier, the second identifier, and the MAC address of the forwarding device.

According to a second aspect, a method for obtaining a cross-domain link is provided. The method includes: receiving, by a forwarding device in an IP domain, a first message sent by a control device that is configured to obtain a cross-domain link, where the first message is used to instruct the forwarding device to search for a device that is adjacent to the forwarding device and that is in an optical domain; generating, by the forwarding device, a second message based on the first message, where the second message includes a MAC address of the forwarding device, and the second message is used to search the optical domain for the device that is adjacent to the forwarding device; and sending, by the forwarding device, the second message to the optical domain through broadcast.

In the foregoing method, the forwarding device in the IP domain may send, when being triggered by the control device that is configured to obtain the cross-domain link, the second message to the optical domain through broadcast, so as to automatically search for the device that is adjacent to the forwarding device in the IP domain and that is in the optical domain. In this way, in a process of configuring a cross-domain service, the cross-domain link does not need to be manually planned and configured in advance. This helps improve efficiency of configuring the cross-domain service.

In an implementation, the second message may be a link layer discovery protocol (LLDP) message, a neighbor discovery protocol (NDP) message, or a network topology discovery protocol (NTDP) message.

Optionally, the second message may further include an identifier of the forwarding device in the IP domain.

According to a third aspect, a method for obtaining a cross-domain link is provided, where the method includes: receiving, by an optical network element in an optical domain, a first message that is sent by a forwarding device in an IP domain through broadcast, where the first message includes a MAC address of the forwarding device, and the first message is used to search the optical domain for a device that is adjacent to the forwarding device; generating, by the optical network element, a second message based on the first message, where the second message includes a first identifier and a second identifier, the first identifier is used to identify the optical network element, and the second identifier is used to identify a port that communicates with the forwarding device and that is on the optical network element; and sending, by the optical network element, the second message to a control device that is configured to obtain the cross-domain link.

In the foregoing method, after receiving the first message that is sent by the forwarding device in the IP domain through broadcast, the forwarding device in the optical domain may send the second message to the control device that is configured to obtain the cross-domain link, so that the control device can obtain the cross-domain link between the forwarding device in the IP domain and the forwarding device in the optical domain based on the second message. In this way, in a process of configuring a cross-domain service, the cross-domain link does not need to be manually planned and configured in advance. This helps improve efficiency of configuring the cross-domain service.

In an implementation, the first message is an LLDP message, an NDP message, or an NTDP message.

According to a fourth aspect, a control device for obtaining a cross-domain link is provided. The control device includes: a sending module configured to send a first message to a forwarding device in an IP domain, where the first message is used to instruct the forwarding device to search for a device that is adjacent to the forwarding device in the IP domain and that is in an optical domain; a receiving module configured to receive a second message from an optical network element in the optical domain, where the second message includes a first identifier, a second identifier, and a MAC address of the forwarding device in the IP domain, the first identifier is used to identify the optical network element, the second identifier is used to identify a port that communicates with the forwarding device and that is on the optical network element, and the optical network element is the device that is adjacent to the forwarding device and that is in the optical domain; and an obtaining module configured to obtain the cross-domain link between the optical network element and the forwarding device in the IP domain based on the first identifier, the second identifier, and the MAC address of the forwarding device.

In an implementation, the control device that is configured to obtain the cross-domain link may further include a module that is configured to implement the methods or the steps provided in any possible implementation of the first aspect.

According to a fifth aspect, a forwarding device in an IP domain is provided. The forwarding device in the IP domain includes: a receiving module configured to receive a first message sent by a control device that is configured to obtain a cross-domain link, where the first message is used to instruct the forwarding device in the IP domain to search for a device that is adjacent to the forwarding device in the IP domain and that is in an optical domain; a generation module configured to generate a second message based on the first message, where the second message includes a MAC address of the forwarding device in the IP domain, and the second message is used to search the optical domain for the device that is adjacent to the forwarding device in the IP domain; and a sending module configured to send the second message to the optical domain through broadcast.

In an implementation, the forwarding device in the IP domain may further include a module that is configured to implement the methods or the steps provided in any possible implementation of the second aspect.

According to a sixth aspect, a forwarding device in an optical domain is provided. The forwarding device in the optical domain includes: a receiving module configured to receive a first message that is sent by a forwarding device in an IP domain through broadcast, where the first message includes a MAC address of the forwarding device in the IP domain, and the first message is used to search the optical domain for a device that is adjacent to the forwarding device in the IP domain; a generation module configured to generate a second message based on the first message, where the second message includes a first identifier and a second identifier, the first identifier is used to identify the forwarding device in the optical domain, and the second identifier is used to identify a port that communicates with the forwarding device in the IP domain and that is on the forwarding device in the optical domain; and a sending module configured to send the second message to a control device that is configured to obtain a cross-domain link.

In an implementation, the forwarding device in the optical domain may further include a module that is configured to implement the method or the steps provided in any possible implementation of the third aspect.

According to a seventh aspect, a network device is provided, including a processor and a memory. The memory stores a computer program instruction. When executing the computer program instruction, the processor implements the method provided in any possible implementation of the first aspect to the third aspect.

According to an eighth aspect, a computer storage medium is provided, and stores a computer program instruction. When the computer program instruction is executed by a network device, the network device implements the method provided in any possible implementation of the first aspect to the third aspect.

BRIEF DESCRIPTION OF DRAWINGS

To describe the solutions in the embodiments more clearly, the following briefly describes the accompanying drawings required for describing the embodiments.

DESCRIPTION OF EMBODIMENTS

The following describes the embodiments with reference to accompanying drawings.

Figure 1:
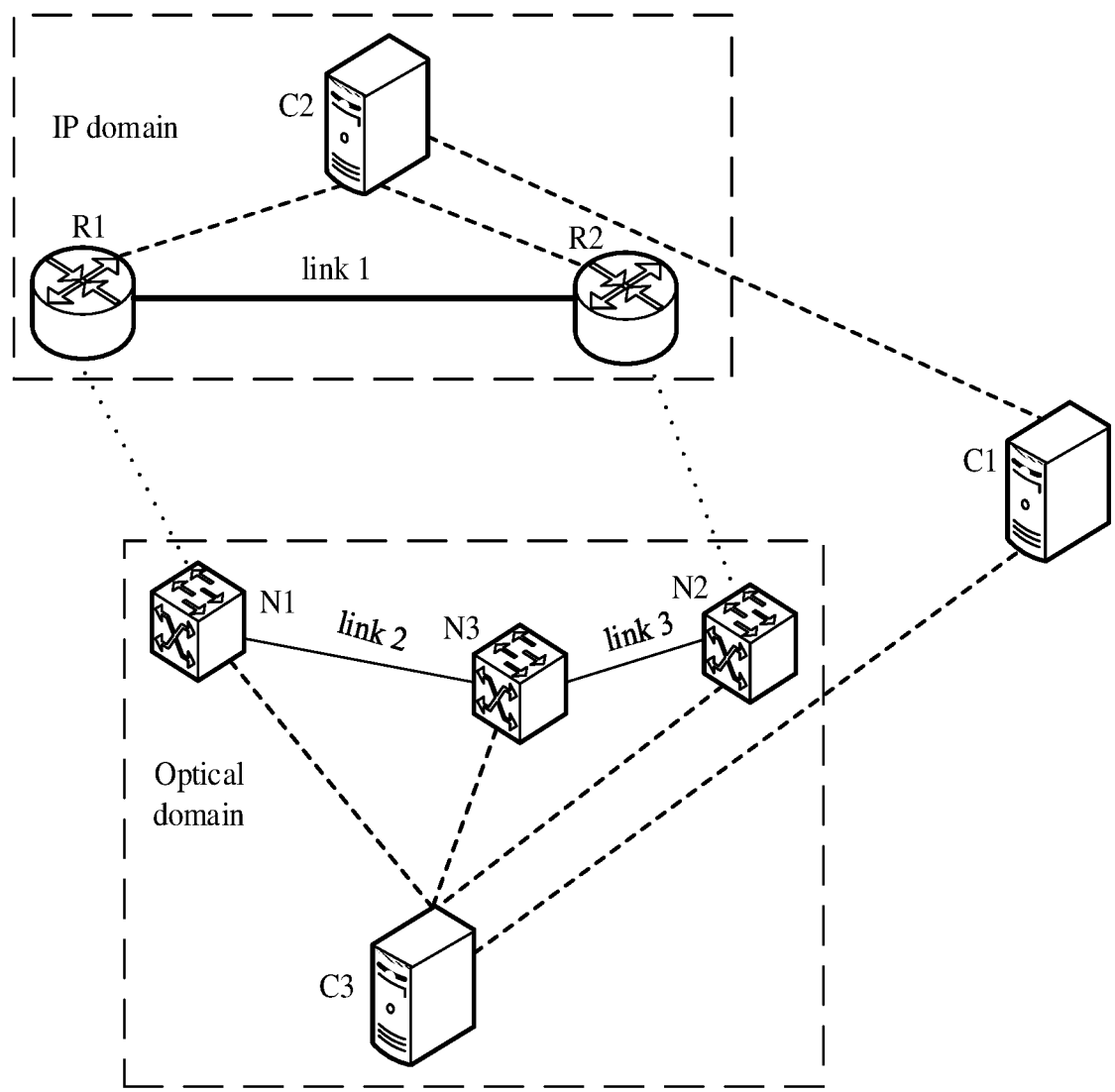
FIG. 1 is a schematic diagram of a network scenario according to an embodiment.

FIG. 1 is a schematic diagram of a network scenario according to an embodiment. The scenario in FIG. 1 is a network scenario combining an IP domain and an optical domain. In the scenario in FIG. 1, R1 is a first forwarding device in the IP domain. R1 may be a start point of a first link. R2 is a second forwarding device in the IP domain R2 may be an end point of the first link. The first link is identified by using a link 1 in FIG. 1. The first link is a link in the IP domain. N1 is a first optical network element in the optical domain. N2 is a second optical network element in the optical domain. N3 is a third optical network element in the optical domain. The optical network element in this embodiment may be a device that has a forwarding function in the optical domain. N1 is a start point of a second link. N3 is an end point of the second link and a start point of a third link. N2 is an end point of the third link. The second link is identified by using a link 2 in FIG. 1. The third link is identified by using a link 3 in FIG. 1. The second link and the third link are links in the optical domain. The links in the optical domain that includes the second link and the third link carry the links to which the first link in the IP domain is mapped in the optical domain. A mapping relationship between the links in the optical domain and the first link in the IP domain may be a correspondence between the links in the optical domain and the first link in the IP domain. A link between R1 and N1 is a cross-domain link. A link between R2 and N2 is a cross-domain link. The cross-domain link helps complete a cross-domain service. The cross-domain service may be a service that crosses the IP domain and the optical domain, in other words, the IP domain and the optical domain cooperate to complete a service. In an implementation, C1, C2, and C3 in FIG. 1 may be used to identify independent control devices. C1 is used to manage and control C2 and C3. C1 is used to obtain the cross-domain link. C2 is used to manage and control the forwarding devices in the IP domain. In this embodiment, the forwarding devices in the IP domain may be a router, a layer-3 switch, or a high-layer switch. C3 is used to manage and control the optical network elements in the optical domain. C2 and C3 cannot communicate with each other, and C2 cannot communicate with a switch in the optical domain. C3 cannot communicate with the forwarding devices in the IP domain. In another implementation, C1, C2, and C3 may be integrated into one control device or one control module. The integrated control device or control module can separately interact with the optical network elements in the optical domain and the forwarding devices in the IP domain, to manage and control the optical network elements and the forwarding devices in the IP domain. In this embodiment, the control device or the control module may be a network management device or a controller in a software-defined networking (SDN) architecture.

Embodiment 1

Figure 2A:
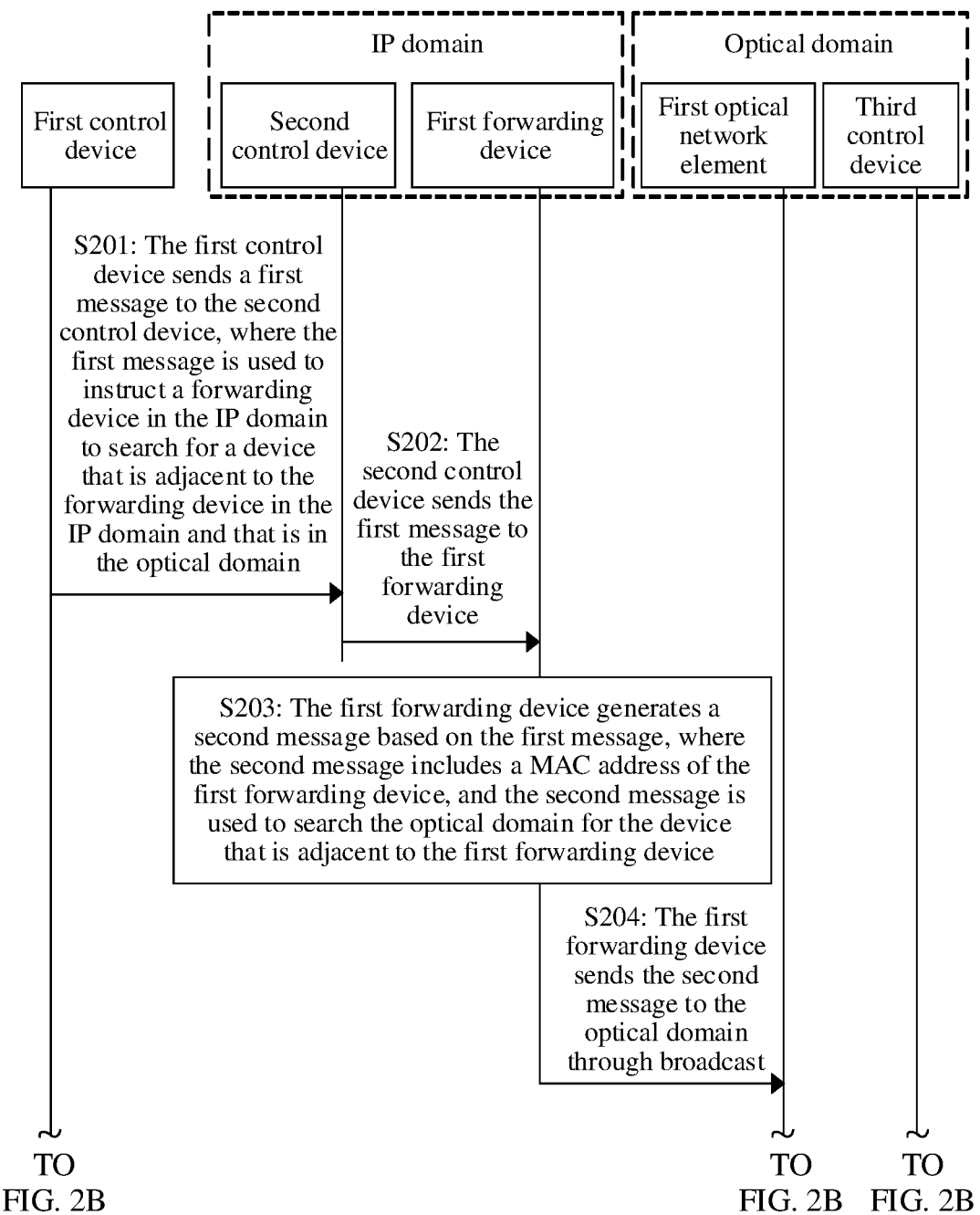
FIG. 2A is a schematic flowchart of a method for obtaining a cross-domain link according to Embodiment 1.
Figure 2B:
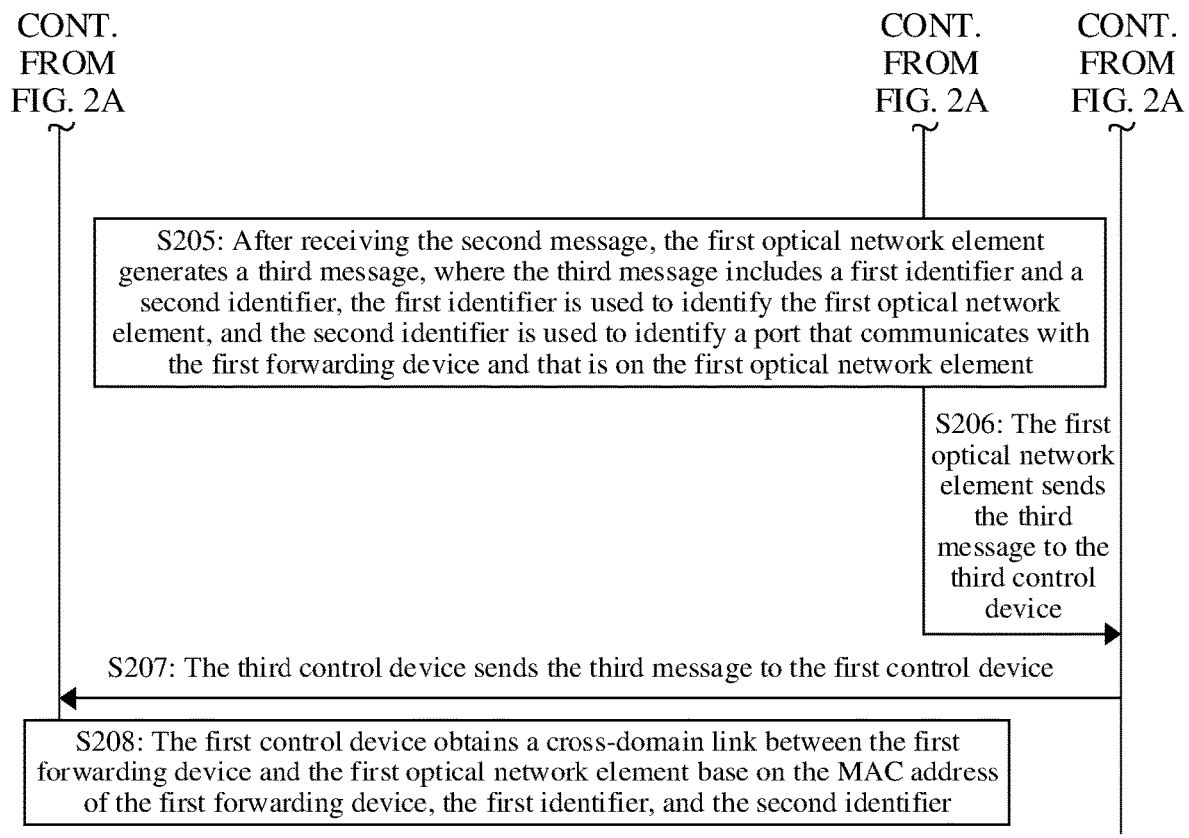
FIG. 2B is a schematic flowchart of a method for obtaining a cross-domain link according to Embodiment 1.

FIG. 2A and FIG. 2B provide a schematic flowchart of a method for obtaining a cross-domain link according to Embodiment 1. A first control device in FIG. 2A and FIG. 2B is C1 in FIG. 1. A second control device in FIG. 2A and FIG. 2B is C2 in FIG. 1. A third control device in FIG. 2A and FIG. 2B is C3 in FIG. 1. The following describes, with reference to FIG. 1, FIG. 2A, and FIG. 2B, the method for obtaining the cross-domain link provided in Embodiment 1.

S201: The first control device sends a first message to the second control device, where the first message is used to instruct a forwarding device in an IP domain to search for a device that is adjacent to the forwarding device in the IP domain and that is in an optical domain.

For example, the first control device is configured to obtain the cross-domain link. The cross-domain link helps complete a service that requires collaboration between the IP domain and the optical domain. The second control device is the control device in the IP domain. The first message may comply with a representation state transfer configuration (restconf) protocol. The first control device can communicate with the second control device, and can manage and control the second control device. The device that is adjacent to the forwarding device in the IP domain and that is in the optical domain may be a device that can communicate with and is adjacent to the forwarding device in the IP domain and that is in the optical domain. In other words, the device that is adjacent to the forwarding device in the IP domain and that is in the optical domain may be a device that is physically connected to the forwarding device in the IP domain. In the scenario in FIG. 1, C1 sends the first message to C2. C2 sends the first message to R1 managed by C2, to instruct R1 to search for a device that is adjacent to R1 and that is in the optical domain. C2 sends the second message to R2 managed by C2, to instruct R2 to search for a device that is adjacent to R2 and that is in the optical domain. The forwarding devices managed by C2 include R1 and R2.

S202: The second control device sends the first message to a first forwarding device.

For example, if a communications protocol between the second control device and the forwarding devices managed by the second control device is the same as a communications protocol between the second control device and the first control device, the second control device directly sends the first message from the first control device to the first forwarding device without converting a packet format. A network configuration protocol (netconf) is used between the second control device and the forwarding devices managed by the second control device. After receiving the first message, the second control device may encapsulate and send the received first message based on the communications protocol between the second control device and the managed forwarding devices. In the scenario in FIG. 1, C2 may send the first message to the forwarding devices managed by C2, for example, R1 and R2 in FIG. 1.

S203: The first forwarding device generates a second message based on the first message, where the second message includes a media access control (MAC) address of the first forwarding device, and the second message is used to search the optical domain for the device that is adjacent to the first forwarding device.

For example, the second message may be a link layer discovery protocol (LLDP) message, a neighbor discovery protocol (NDP) message, or a network topology discovery protocol (NTDP) message. The first forwarding device generates the second message based on an instruction of the first message after receiving the first message. The MAC address of the first forwarding device may be used to identify a port through which the first forwarding device sends the second message. Optionally, the second message may further include an identifier of the first forwarding device and/or a port identifier of the first forwarding device. The port identifier of the first forwarding device may be identification information different from the MAC address of the first forwarding device. In the scenario in FIG. 1, R1 generates a first neighbor discovery message based on the first message sent by C2. The first neighbor discovery message includes a MAC address of R1. The MAC address of R1 is used to identify a port through which R1 sends the first neighbor discovery message. R2 generates a second neighbor discovery message based on the first message sent by C2. The second neighbor discovery message includes a MAC address of R2. The MAC address of R2 is used to identify a port through which R2 sends the second neighbor discovery message.

S204: The first forwarding device sends the second message to the optical domain through broadcast.

For example, the first forwarding device may send the second message to the optical domain through broadcast and through the port identified by the first forwarding device. In the scenario in FIG. 1, R1 sends the first neighbor discovery message through broadcast and through the port identified by the MAC address of R1. An optical network element that is physically connected to R1 and that is in the optical domain can receive the first neighbor discovery message sent by R1 through broadcast. R2 sends the second neighbor discovery message through broadcast and through the port identified by the MAC address of R2. An optical network element that is physically connected to R2 and that is in the optical domain can receive the second neighbor discovery message sent by R2 through broadcast.

S205: After receiving the second message, a first optical network element generates a third message, where the third message includes a first identifier and a second identifier, the first identifier is used to identify the first optical network element, and the second identifier is used to identify a port that communicates with the first forwarding device and that is on the first optical network element.

For example, after receiving the second message, the first optical network element obtains the second identifier. The second identifier may be a combination of a shelf number, a slot number, and a port number. Alternatively, the second identifier may be an identifier in another form. This is not limited herein. The port that is on the first optical network element and that can communicate with the first forwarding device may be a service port on a tributary board of the first optical network element. The third message generated by the first optical network element meets a communications protocol between the first optical network element and the third control device. In the scenario in FIG. 1, the first neighbor discovery message sent by R1 through broadcast to the optical domain is received only by the optical network element that is physically connected to R1. N1 receives the first neighbor discovery message sent by R1 through broadcast. N1 obtains the first neighbor discovery message or the MAC address of R1 included in the first neighbor discovery message. N1 further obtains an identifier of N1 and an identifier of a port through which the first neighbor discovery message is received. The second neighbor discovery message sent by R2 through broadcast to the optical domain is received only by the optical network element that is physically connected to R2. N2 obtains the second neighbor discovery message or the MAC address of R2 included in the second neighbor discovery message. N2 further obtains an identifier of N2 and an identifier of a port through which the second neighbor discovery message is received.

S206: The first optical network element sends the third message to the third control device.

For example, the third message may be sent based on the netconf. In the scenario in FIG. 1, N1 may send, to C3, the first neighbor discovery message, the identifier of N1, and the identifier of the port through which the first neighbor discovery message is received. Alternatively, N1 may send, to C3, the MAC address of R1, the identifier of N1, and the identifier of the port through which the first neighbor discovery message is received. N2 may send, to C3, the second neighbor discovery message, an identifier of N2, and the identifier of the port through which the second neighbor discovery message is received. N2 may send, to C3, the MAC address of R2, the identifier of N2, and the identifier of the port through which the second neighbor discovery message is received.

Optionally, S205 and S206 may further be replaced with the following: The third control device listens to the port on the first optical network element, to obtain the first identifier, the second identifier, and the second message. Alternatively, S205 and S206 may be replaced with the following: the third control device listens to the port on the first optical network element, to obtain the first identifier, the second identifier, and the MAC address of the first forwarding device.

S207: The third control device sends the third message to the first control device.

For example, the third control device may send the third message based on the restconf protocol. In the network scenario in FIG. 1, C3 sends, to C1, the MAC address of R1, the identifier of N1, and the identifier of the port through which the first neighbor discovery message is received that are obtained from N1. C3 sends, to C1, the MAC address of R2, the identifier of N2, and the identifier of the port through which the second neighbor discovery message is received.

S208: The first control device obtains a cross-domain link between the first forwarding device and the first optical network element based on the MAC address of the first forwarding device, the first identifier, and the second identifier.

For example, the first control device obtains a correspondence based on the MAC address of the first forwarding device, the first identifier, and the second identifier. The correspondence is used to indicate the cross-domain link between the first forwarding device and the first optical network element. The correspondence includes the MAC address of the first forwarding device, the first identifier, and the second identifier. In the scenario in FIG. 1, C1 may obtain, based on a parameter received from C3, that there is a cross-domain link between N1 and R1, and there is a cross-domain link between N2 and R2. C1 obtains a first correspondence based on the parameter from C3. The first correspondence includes the MAC address of R1, the identifier of N1, and the identifier of the port through which N1 receives the first neighbor discovery message. The first correspondence is used to indicate the cross-domain link between R1 and N1. C1 obtains a second correspondence based on the parameter from C3. The second correspondence includes the MAC address of R2, the identifier of N2, and the identifier of the port through which N2 receives the second neighbor discovery message. The second correspondence is used to indicate a cross-domain link between R2 and N2.

In the method provided in Embodiment 1, the first control device may determine, by triggering the first forwarding device to send the third message to the optical domain through broadcast, that there is a connection between the first optical network element in the optical domain and the first forwarding device. By using the method, the first control device can obtain the cross-domain link between the optical network element in the optical domain and the forwarding device in the IP domain, for example, the identifier of the optical network element, the identifier of the port of the optical network element, and the identifier of the port of the forwarding device in the IP domain. In this way, in a process of configuring a cross-domain service, the first control device may obtain the cross-domain link between the IP domain and the optical domain by using the method in Embodiment 1, and the cross-domain link does not need to be manually planned and configured in advance. This helps improve efficiency of configuring the cross-domain service.

Embodiment 2

Figure 3:
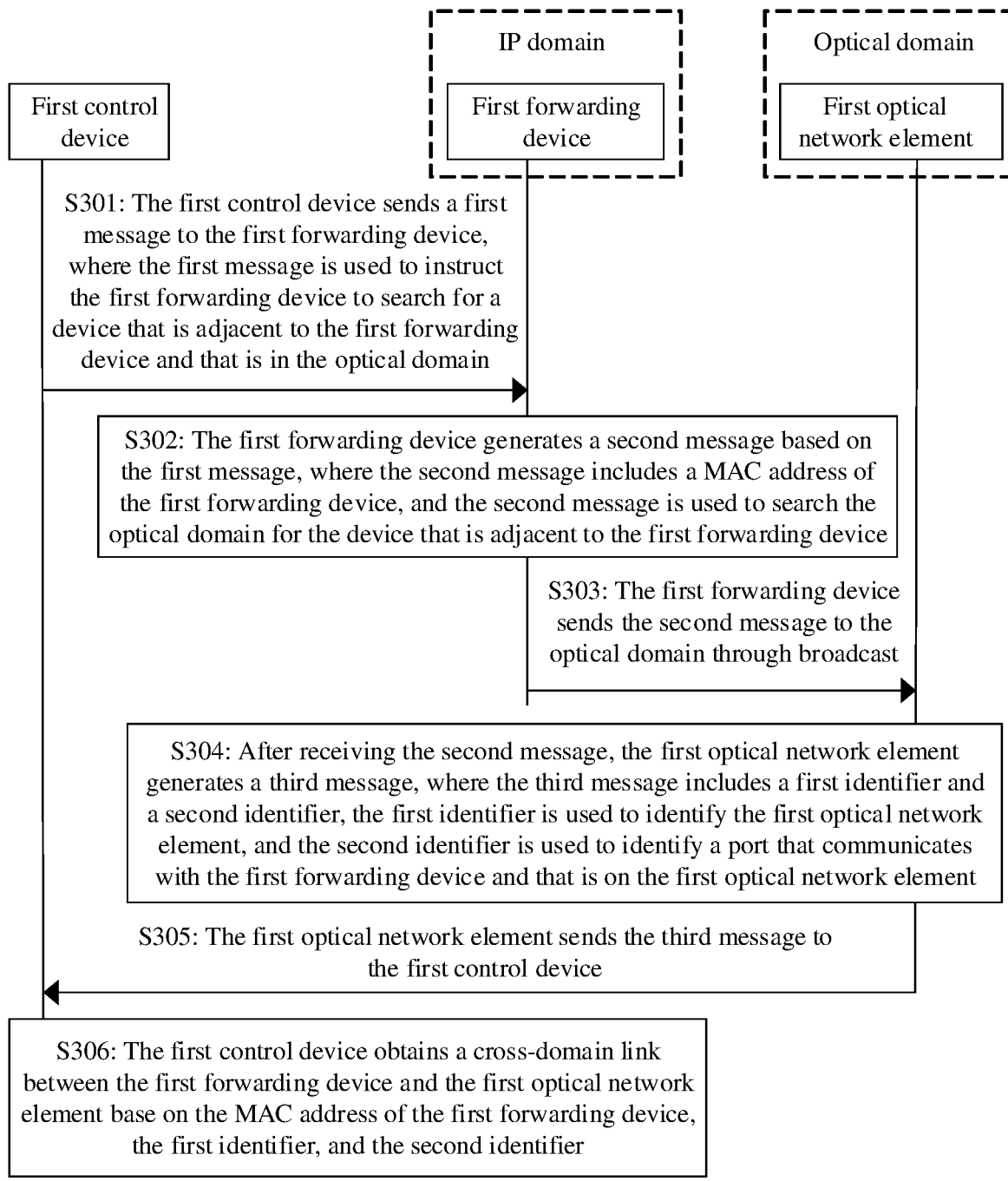
FIG. 3 is a schematic flowchart of a method for obtaining a cross-domain link according to Embodiment 2.

FIG. 3 is a schematic flowchart of a method for obtaining a cross-domain link according to Embodiment 2. A first control device in FIG. 3 is a device that integrates C1, C2, and C3 in FIG. 1. The following describes, with reference to FIG. 1 and FIG. 3, a method for obtaining a cross-domain link according to Embodiment 2.

S301: The first control device sends a first message to a first forwarding device, where the first message is used to instruct the first forwarding device to search for a device that is adjacent to the first forwarding device and that is in an optical domain.

For example, the first control device in Embodiment 2 has functions of the first control device, the second control device, and the third control device that are in Embodiment 1. A netconf communications protocol is used between the first control device and a forwarding device in an IP domain managed by the first control device.

S302: The first forwarding device generates a second message based on the first message, where the second message includes a MAC address of the first forwarding device, and the second message is used to search the optical domain for the device that is adjacent to the first forwarding device.

For example, the second message may be an LLDP message, an NDP message, or an NTDP message. For a method for generating the second message by the first forwarding device, refer to S203 in Embodiment 1.

S303: The first forwarding device sends the second message to the optical domain through broadcast.

For content of S303, refer to the content of S204 in Embodiment 1.

S304: After receiving the second message, a first optical network element generates a third message, where the third message includes a first identifier and a second identifier, the first identifier is used to identify the first optical network element, and the second identifier is used to identify a port that communicates with the first forwarding device and that is on the first optical network element.

For content of S304, refer to content of S205 in Embodiment 1.

S305: The first optical network element sends the third message to the first control device.

For a method for sending the third message by the first optical network element to the first control device, refer to the corresponding content of S206 in Embodiment 1.

Optionally, S304 and S305 may alternatively be replaced with the following: The third control device listens to a port on the first optical network element, to obtain the first identifier, the second identifier, and the second message. Alternatively, S304 and S305 may be replaced with the following: The first control device listens to a port of the first optical network element, to obtain the first identifier, the second identifier, and the MAC address of the first forwarding device.

S306: The first control device obtains a cross-domain link between the first forwarding device and the first optical network element based on the MAC address of the first forwarding device, the first identifier, and the second identifier.

For content of S306, refer to the content of S208 in Embodiment 1.

In the method in Embodiment 2, the first control device can separately manage an optical network element in the optical domain and the forwarding device in the IP domain. The first control device may directly trigger the first forwarding device to send the second message to the optical domain through broadcast, so as to obtain a cross-domain link between the optical network element in the optical domain and the forwarding device in the IP domain, for example, an identifier of the optical network element, an identifier of a port of the optical network element, and an identifier of a port of the forwarding device in the IP domain. In this way, in a process of configuring a cross-domain service, the first control device may obtain the cross-domain link between the IP domain and the optical domain by using the method in Embodiment 2, and the cross-domain link does not need to be manually planned and configured in advance. This helps improve efficiency of configuring the cross-domain service.

Figure 4:
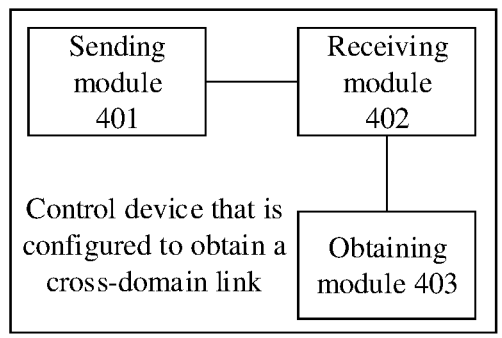
FIG. 4 is a schematic structural diagram of a control device that is configured to obtain a cross-domain link according to an embodiment.

FIG. 4 is a schematic structural diagram of a control device that is configured to obtain a cross-domain link according to an embodiment. The control device may be the first control device in Embodiment 2, or may be a device that integrates the first control device, the second control device, and the third control device in Embodiment 1. The control device may implement a function of the device that integrates the first control device, the second control device, and the third control device in Embodiment 1, or the control device may implement a function of the first control device in Embodiment 2. Alternatively, the control device may be a device that integrates C1, C2, and C3 in FIG. 1. The following describes, with reference to FIG. 4, the control device provided in this embodiment.

The control device that is configured to obtain the cross-domain link provided in this embodiment includes: a sending module 401, a receiving module 402, and an obtaining module 403.

The sending module 401 is configured to send a first message to a forwarding device in an IP domain. The first message is used to instruct the forwarding device to search for a device that is adjacent to the forwarding device in the IP domain and that is in an optical domain. The receiving module 402 is configured to receive a second message from an optical network element in the optical domain. The second message includes a first identifier, a second identifier, and a MAC address of the forwarding device in the IP domain. The first identifier is used to identify the optical network element, the second identifier is used to identify a port that communicates with the forwarding device and that is on the optical network element, and the optical network element is the device that is adjacent to the forwarding device and that is in the optical domain. The obtaining module 403 is configured to obtain a cross-domain link between the optical network element and the forwarding device in the IP domain based on the first identifier, the second identifier, and the MAC address of the forwarding device.

For example, the obtaining module 403 is configured to obtain a correspondence based on the first identifier, the second identifier, and the MAC address of the forwarding device in the IP domain. The correspondence is used to indicate the cross-domain link between the optical network element and the forwarding device in the IP domain, and the correspondence includes the first identifier, the second identifier, and the MAC address of the forwarding device in the IP domain.

Optionally, the control device further includes a control module in the IP domain and a control module in the optical domain. The control module in the IP domain is configured to: receive the first message sent by the sending module 401, and forward the first message to the forwarding device in the IP domain. The control module in the optical domain is configured to: receive the second message sent by the optical network element, and forward the second message to the receiving module 402. That the sending module 401 sends the first message to the forwarding device in the IP domain includes: the sending module 401 sends the first message to the control module in the IP domain, and the control module in the IP domain forwards the first message to the forwarding device in the IP domain. That the receiving module 402 receives the second message from the optical network element in the optical domain includes: the control module in the optical domain receives the second message sent by the optical network element, and forwards the second message to the receiving module 402.

Figure 5:
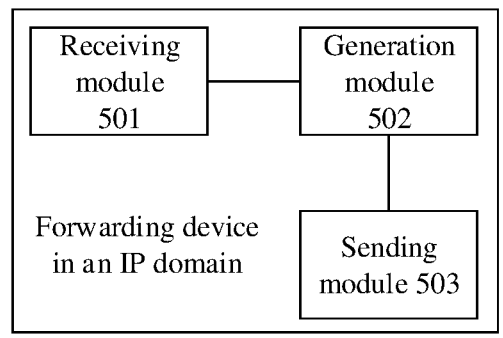
FIG. 5 is a schematic structural diagram of a forwarding device in an IP domain according to an embodiment.

FIG. 5 is a schematic structural diagram of a forwarding device in an IP domain according to an embodiment. The forwarding device in the IP domain may be the first forwarding device in Embodiment 1 or Embodiment 2. Alternatively, the forwarding device in the IP domain may be R1 or R2 in FIG. 1. The forwarding device in the IP domain may implement a function of the first forwarding device in Embodiment 1 or Embodiment 2. The following describes, with reference to FIG. 5, a forwarding device in an IP domain according to an embodiment.

The forwarding device in the IP domain provided in this embodiment includes a receiving module 501, a generation module 502, and a sending module 503. The receiving module 501 is configured to receive a first message sent by a control device that is configured to obtain a cross-domain link. The first message is used to instruct the forwarding device in the IP domain to search for a device that is adjacent to the forwarding device in the IP domain and that is in an optical domain. The generation module 502 is configured to generate a second message based on the first message. The second message includes a MAC address of the forwarding device in the IP domain. The second message is used to search the optical domain for the device that is adjacent to the forwarding device in the IP domain. The sending module 503 is configured to send the second message to the optical domain through broadcast. The second message is an LLDP message, an NDP message, or an NTDP message.

Figure 6:
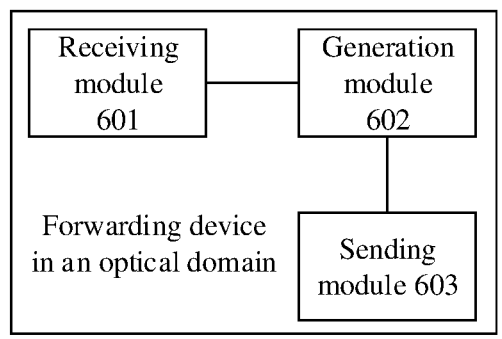
FIG. 6 is a schematic structural diagram of a forwarding device in an optical domain according to an embodiment.

FIG. 6 is a schematic structural diagram of a forwarding device in an optical domain according to an embodiment. The forwarding device in the optical domain may be a first optical network element in Embodiment 1 or Embodiment 2. Alternatively, the forwarding device in the optical domain may be N1 or N2 in FIG. 1. The forwarding device in the optical domain may implement a function of the first optical network element in Embodiment 1 or Embodiment 2. The following describes, with reference to FIG. 6, the forwarding device in the optical domain according to an embodiment.

The forwarding device in the optical domain provided in this embodiment includes a receiving module 601, a generation module 602, and a sending module 603. The receiving module 601 is configured to receive a first message that is sent by a forwarding device in an IP domain through broadcast. The first message includes a MAC address of the forwarding device in the IP domain. The first message is used to search the optical domain for a device that is adjacent to the forwarding device in the IP domain. The generation module 602 is configured to generate a second message based on the first message. The second message includes a first identifier and a second identifier. The first identifier is used to identify the forwarding device in the optical domain. The second identifier is used to identify a port that communicates with the forwarding device in the IP domain and that is on the forwarding device in the optical domain. The sending module 603 is configured to send the second message to a control device that is configured to obtain a cross-domain link. The first message is an LLDP message, an NDP message, or an NTDP message.

Figure 7:
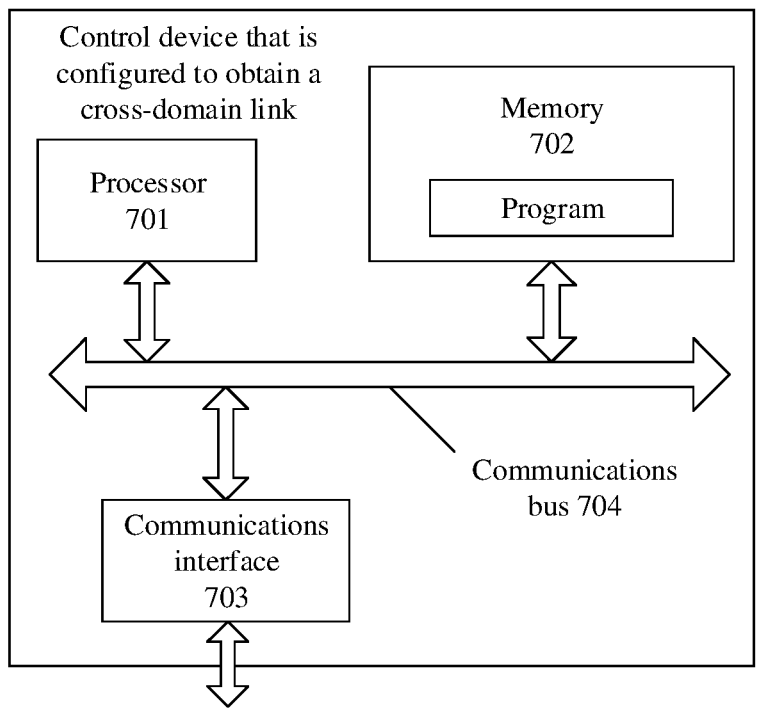
FIG. 7 is a schematic structural diagram of a control device that is configured to obtain a cross-domain link according to an embodiment.

FIG. 7 is a schematic structural diagram of a control device that is configured to obtain a cross-domain link according to an embodiment. The control device and the control device in FIG. 4 may be a same device. The control device may implement a function of a device that integrates the first control device, the second control device, and the third control device in Embodiment 1, or the control device may implement a function of the first control device in Embodiment 2. The following describes, with reference to FIG. 7, the control device provided in this embodiment. The control device in this embodiment includes a processor 701, a memory 702, and a communications interface 703. The processor 701, the memory 702, and the communications interface 703 are connected by using a communications bus 704. The memory 702 is configured to store a program. The processor 701 performs, according to an executable instruction included in the program read from the memory 702, the method steps performed by the control device in Embodiment 1 or Embodiment 2. The processor 701 may receive and send a message or a packet by using the communications interface 703. For details, refer to the corresponding content in Embodiment 1 and Embodiment 2.

Figure 8:
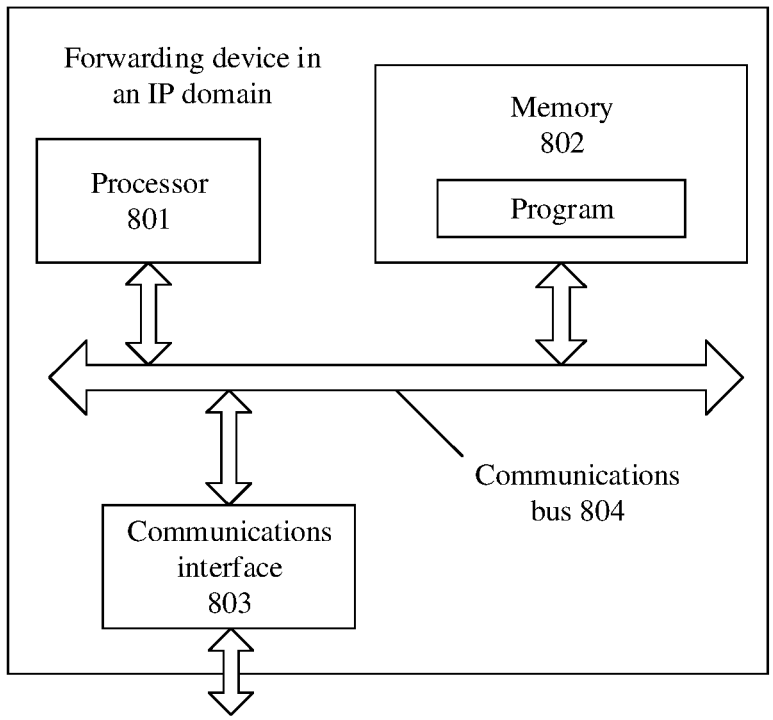
FIG. 8 is a schematic structural diagram of a forwarding device in an IP domain according to an embodiment.

FIG. 8 is a schematic structural diagram of a forwarding device in an IP domain according to an embodiment. The forwarding device in the IP domain and the forwarding device in the IP domain in FIG. 5 may be a same device. The forwarding device in the IP domain may implement a function of the first forwarding device in Embodiment 1 or Embodiment 2. The following describes, with reference to FIG. 8, the forwarding device in the IP domain according to an embodiment. The forwarding device in the IP domain in this embodiment includes a processor 801, a memory 802, and a communications interface 803. The processor 801, the memory 802, and the communications interface 803 are connected by using a communications bus 804. The memory 802 is configured to store a program. The processor 801 performs, according to an executable instruction included in the program read from the memory 802, the method steps performed by the first forwarding device in Embodiment 1 or Embodiment 2. The processor 801 may receive and send a message or a packet by using the communications interface 803. For details, refer to the corresponding content in Embodiment 1 or Embodiment 2.

Figure 9:
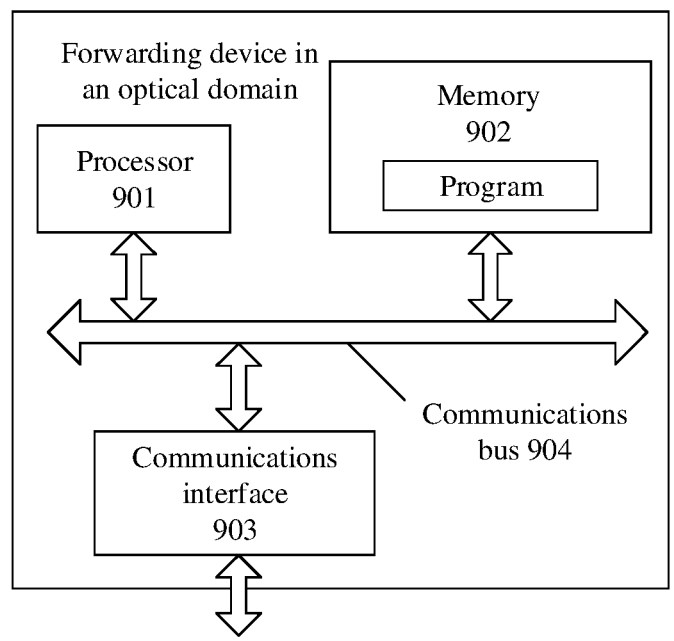
FIG. 9 is a schematic structural diagram of a forwarding device in an optical domain according to an embodiment.

FIG. 9 is a schematic structural diagram of a forwarding device in an optical domain according to an embodiment. The forwarding device in the optical domain and the forwarding device in the optical domain in FIG. 6 may be a same device. The forwarding device in the optical domain may implement a function of the first optical network element in Embodiment 1 or Embodiment 2. The following describes, with reference to FIG. 9, the forwarding device in the optical domain according to an embodiment. The forwarding device in the optical domain in this embodiment includes a processor 901, a memory 902, and a communications interface 903. The processor 901, the memory 902, and the communications interface 903 are connected by using a communications bus 904. The memory 902 is configured to store a program. The processor 901 performs, according to an executable instruction included in the program read from the memory 902, the method steps performed by the first optical network element in Embodiment 1 or Embodiment 2. The processor 901 may receive and send a message or a packet by using the communications interface 903. For details, refer to the corresponding content in Embodiment 1 or Embodiment 2.

In an embodiment, a computer storage medium is further provided. The computer storage medium stores a computer program instruction. When the computer program instruction is executed by a network device, the network device implements the method performed by the control device in Embodiment 1 or Embodiment 2.

In an embodiment, a computer storage medium is further provided. The computer storage medium stores a computer program instruction. When the computer program instruction is executed by a network device, the network device implements the method performed by the first forwarding device in Embodiment 1 or Embodiment 2.

In an embodiment, a computer storage medium is further provided. The computer storage medium stores a computer program instruction. When the computer program instruction is executed by a network device, the network device implements the method performed by the first optical network element in Embodiment 1 or Embodiment 2.

A general-purpose processor in the embodiments may be a microprocessor or the processor may be any conventional processor. The steps of the methods described with reference to the embodiments may be directly performed by using a combination of hardware in the processor and a software module. When it is implemented by using software, code that implements the foregoing functions may be stored in a computer-readable medium. The computer-readable medium includes a computer storage medium. The storage medium may be any available medium accessible to a computer. The following is used as an example, but is non-limiting: the computer readable medium may be a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. The computer-readable medium may be a compact disc (CD), a laser disc, a digital video disc (DVD), a floppy disk, or a Blu-ray disc.

The embodiments are all described in a progressive manner, for same or similar parts in the embodiments, refer to these embodiments, and each embodiment focuses on a difference from other embodiments. For example, a system embodiment is basically similar to a method embodiment, and therefore is described briefly; for related parts, refer to partial descriptions in the method embodiment.

What is claimed is:

1. A method for obtaining a cross-domain link, the method comprising:

sending, by a control device, a first message to a forwarding device in an internet protocol (IP) domain via a control part in the IP domain of the control device, wherein the first message is used to instruct the forwarding device to search for a device that is adjacent to the forwarding device and that is in an optical domain;

receiving, by the control device, a second message from an optical network element in the optical domain via a control part in the optical domain of the control device, wherein the second message comprises a first identifier, a second identifier, and a media access control (MAC) address of the forwarding device, the first identifier is used to identify the optical network element, the second identifier is used to identify a port that communicates with the forwarding device and that is on the optical network element, and the optical network element is the device that is adjacent to the forwarding device and that is in the optical domain; and obtaining, by the control device, the cross-domain link between the forwarding device and the optical network element based on the first identifier, the second identifier, and the MAC address of the forwarding device, wherein:

the first message is sent by a sending module, and the control device receives and forwards the first message to the forwarding device in the IP domain;

the control device receives the second message sent by the optical network element, and the control device forwards the second message to a receiving module; and the control device sends the first message to a control module in the IP domain, and the control module in the IP domain forwards the first message to the forwarding device in the IP domain, wherein the receiving of the second message from the optical network element in the optical domain comprises:

receiving of the second message sent by the optical network element, and forwarding the second message to the receiving module.

2. The method according to claim 1, wherein the obtaining, by the control device, of the cross-domain link between the forwarding device and the optical network element based on the first identifier, the second identifier, and the MAC address of the forwarding device comprises:

obtaining, by the control device, a correspondence based on the first identifier, the second identifier, and the MAC address of the forwarding device, wherein the correspondence is used to indicate the cross-domain link between the forwarding device and the optical network element, and the correspondence comprises the first identifier, the second identifier, and the MAC address of the forwarding device.

3. A method for obtaining a cross-domain link, the method comprising:

receiving, by a forwarding device in an internet protocol (IP) domain, a first message sent by a control part in the IP domain of a control device that is configured to obtain a cross-domain link, wherein the first message is used to instruct the forwarding device to search for a device that is adjacent to the forwarding device and that is in an optical domain;

generating, by the forwarding device, a second message based on the first message, wherein the second message comprises a media access control (MAC) address of the forwarding device, and the second message is used to search the optical domain for the device that is adjacent to the forwarding device; and sending, by the forwarding device, the second message to the optical domain through broadcast, wherein:

the first message is sent by a sending module, and the control device receives and forwards the first message to the forwarding device in the IP domain, and the control device receives a third message from the optical domain, and the control device forwards the third message to a receiving module; and the control device sends the first message to a control module in the IP domain, and the control module in the IP domain forwards the first message to the forwarding device in the IP domain.

4. The method according to claim 3, wherein the second message is a link layer discovery protocol (LLDP) message.

5. The method according to claim 3, wherein the second message is a neighbor discovery protocol (NDP) message.

6. The method according to claim 3, wherein the second message is a network topology discovery protocol (NTDP) message.

7. A control device for obtaining a cross-domain link, the control device comprising:

a processor; and a non-transitory computer-readable storage medium coupled to the processor and storing programming instructions for execution by the processor, the programming instructions instruct the processor to:

send a first message to a forwarding device in an internet protocol (IP) domain via a control part in the IP domain of the control device, wherein the first message is used to instruct the forwarding device to search for a device that is adjacent to the forwarding device in the IP domain and that is in an optical domain;

receive a second message from an optical network element in the optical domain via a control part in the optical domain of the control device, wherein the second message comprises a first identifier, a second identifier, and a media access control (MAC) address of the forwarding device in the IP domain, the first identifier is used to identify the optical network element, the second identifier is used to identify a port that communicates with the forwarding device and that is on the optical network element, and the optical network element is the device that is adjacent to the forwarding device and that is in the optical domain; and obtain the cross-domain link between the optical network element and the forwarding device in the IP domain based on the first identifier, the second identifier, and the MAC address of the forwarding device, wherein the programming instructions further instruct the processor to:

receive the first message sent by a sending module, and forward the first message to the forwarding device in the IP domain, and receive the second message sent by the optical network element, and forward the second message to a receiving module; and send the first message to a control module in the IP domain, and forward, by the control module in the IP domain, the first message to the forwarding device in the IP domain;

wherein the receiving of the second message from the optical network element in the optical domain comprises:

receiving of the second message sent by the optical network element, and forwarding the second message to the receiving module.

8. The control device according to claim 7, wherein the programming instructions instruct the processor to: obtain a correspondence based on the first identifier, the second identifier, and the MAC address of the forwarding device in the IP domain, the correspondence is used to indicate the cross-domain link between the optical network element and the forwarding device in the IP domain, and the correspondence comprises the first identifier, the second identifier, and the MAC address of the forwarding device in the IP domain.

9. A forwarding device in an internet protocol (IP) domain, the forwarding device in the IP domain comprising:

a processor; and a non-transitory computer-readable storage medium coupled to the processor and storing programming instructions for execution by the processor, the programming instructions instruct the processor to:

receive a first message sent by a control part in the IP domain of a control device that is configured to obtain a cross-domain link, wherein the first message is used to instruct the forwarding device in the IP domain to search for a device that is adjacent to the forwarding device in the IP domain and that is in an optical domain;

generate a second message based on the first message, wherein the second message comprises a media access control (MAC) address of the forwarding device in the IP domain, and the second message is used to search the optical domain for the device that is adjacent to the forwarding device in the IP domain; and send the second message to the optical domain through broadcast, wherein:

the first message is sent by a sending module, and the control device receives and forwards the first message to the forwarding device in the IP domain, and the control device receives a third message from the optical domain, and the control device forwards the third message to a receiving module; and the control device sends the first message to a control module in the IP domain, and the control module in the IP domain forwards the first message to the forwarding device in the IP domain.

10. The forwarding device in the IP domain according to claim 9, wherein the second message is a link layer discovery protocol (LLDP) message.

11. The forwarding device in the IP domain according to claim 9, wherein the second message is a neighbor discovery protocol (NDP) message.

12. The forwarding device in the IP domain according to claim 9, wherein the second message is a network topology discovery protocol (NTDP) message.

* * * * *